US010800345B2

United States Patent
Wato et al.

(10) Patent No.: US 10,800,345 B2
(45) Date of Patent: Oct. 13, 2020

(54) VEHICULAR CAMERA APPARATUS

(71) Applicants: DENSO CORPORATION, Kariya, Aichi-pref. (JP); RICOH COMPANY, LTD., Tokyo (JP)

(72) Inventors: Koji Wato, Kariya (JP); Tatsuhiko Futamura, Kariya (JP); Shuuji Takamatsu, Yokohama (JP); Takayoshi Shimizu, Yokohama (JP)

(73) Assignees: DENSO CORPORATION, Kariya, Aichi-Pref. (JP); RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/145,884

(22) Filed: Sep. 28, 2018

(65) Prior Publication Data

US 2019/0100158 A1 Apr. 4, 2019

(30) Foreign Application Priority Data

Sep. 29, 2017 (JP) .................................. 2017-191330

(51) Int. Cl.
| | |
|---|---|
| *H04N 5/225* | (2006.01) |
| *B60R 11/04* | (2006.01) |
| *H04N 5/247* | (2006.01) |
| *B60R 11/00* | (2006.01) |

(52) U.S. Cl.
CPC .......... *B60R 11/04* (2013.01); *H04N 5/2252* (2013.01); *H04N 5/247* (2013.01); *B60R 2011/0026* (2013.01)

(58) Field of Classification Search
CPC ...... H04N 5/2252; H04N 5/247; B60R 11/04; B60R 2011/0026

USPC ........................................................ 348/148
See application file for complete search history.

(56) References Cited

U.S. PATENT DOCUMENTS

| | | | |
|---|---|---|---|
| 6,811,330 B1 | 11/2004 | Tozawa | |
| 8,400,560 B1* | 3/2013 | Yang | ........................ B60R 11/04 348/148 |
| 2007/0237517 A1* | 10/2007 | Park | ........................ G03B 17/00 396/427 |
| 2008/0001727 A1 | 1/2008 | Ohsumi et al. | |
| 2009/0135246 A1 | 5/2009 | Uchiyama et al. | |
| 2010/0117862 A1* | 5/2010 | Luft | ........................ B60R 11/04 340/932.2 |
| 2010/0128245 A1* | 5/2010 | Inagaki | ................... B60R 11/04 356/4.01 |

(Continued)

FOREIGN PATENT DOCUMENTS

| | | |
|---|---|---|
| DE | 20 2004 014 825 U1 | 11/2004 |
| JP | H11-301365 | 11/1999 |

(Continued)

*Primary Examiner* — Michael Lee
(74) *Attorney, Agent, or Firm* — Maschoff Brennan (57) ABSTRACT

In a vehicular camera apparatus, at least one imaging unit captures an image of a region located outside a vehicle, and a first housing configured to install the at least one imaging unit thereto. A housing assembly includes a second housing configured as a separate member from the first housing, and includes a vehicle attachment provided to the second housing and attached to a part of the vehicle. The housing assembly is configured to fixedly support the first housing between the part of the vehicle and the second housing while the vehicle attachment is attached to the part of the vehicle.

12 Claims, 3 Drawing Sheets

(56) References Cited

U.S. PATENT DOCUMENTS

| | | | |
|---|---|---|---|
| 2014/0132739 A1 | 5/2014 | Ohsumi et al. | |
| 2014/0247390 A1* | 9/2014 | Ohsumi | B60R 11/04 348/373 |
| 2014/0313337 A1* | 10/2014 | Devota | B60R 11/04 348/148 |
| 2015/0215606 A1* | 7/2015 | Sasada | G03B 35/08 348/47 |
| 2015/0326760 A1* | 11/2015 | Knutsson | H04N 5/2253 348/148 |
| 2016/0307953 A1* | 10/2016 | Kono | H01L 27/14618 |
| 2017/0057421 A1* | 3/2017 | Takehara | B60R 11/04 |
| 2017/0088062 A1 | 3/2017 | Lee et al. | |
| 2017/0164491 A1* | 6/2017 | Janson | H05K 5/0069 |
| 2019/0104244 A1 | 4/2019 | Kobayashi et al. | |

FOREIGN PATENT DOCUMENTS

| | | |
|---|---|---|
| JP | 2001-242521 | 9/2001 |
| JP | 2003-335180 | 11/2003 |
| JP | 2006-091177 | 4/2006 |
| JP | 2007-263669 | 10/2007 |
| JP | 2012-155102 | 8/2012 |
| JP | 2012-189324 | 10/2012 |
| JP | 2013-072839 | 4/2013 |
| JP | 2013-127598 | 6/2013 |
| JP | 2014-065393 | 4/2014 |
| JP | 2015-056818 | 3/2015 |

* cited by examiner

VEHICULAR CAMERA APPARATUS

CROSS REFERENCE TO RELATED APPLICATIONS

This application is based on and claims the benefit of priority from Japanese Patent Application 2017-191330 filed on Sep. 29, 2017, the disclosure of which is incorporated in its entirety herein by reference.

TECHNICAL FIELD

The present disclosure relates to vehicular camera apparatuses mountable in a vehicle.

BACKGROUND

A vehicular camera apparatus installed in a vehicle includes an imaging unit and a housing to which the imaging unit is installed. Such a vehicular camera apparatus is configured such that the imaging unit captures images around the vehicle and/or images of the inside of the vehicle. The housing of such a vehicular camera apparatus may be fastened to a vehicle with screws, such as bolts. This fastening of the housing of the vehicular camera apparatus to the housing may cause the housing to be distorted. The distortion in the housing may cause the actual installation position and the actual imaging direction of the imaging unit to be different from a previously designed installation position and a previously designed imaging direction of the imaging unit. This therefore may make it difficult for the imaging unit to capture desired images.

From this viewpoint, Japanese Patent Application Publication No. H11-301365 discloses a conventional vehicular camera apparatus.

The conventional vehicular camera apparatus includes a camera stay, serving as a housing, to which imaging units, such as charge-coupled devices (CCDs), are supported. The camera stay has opposing first and second ends. The camera stay includes a secure member mounted to the second end thereof and fixedly attached to a vehicular attachment portion of the front head of a vehicle, and includes a highly rigid rib mounted to the first end thereof. The highly rigid rib restricts the position of the CCDs. The secure member is fastened via a resin spacer to the vehicle attachment portion of the front end of the vehicle with bolts.

That is, even if the secure member mounted to the second end of the camera stay is fastened via the resin spacer to the vehicle attachment portion of the front end of the vehicle with bolts, the highly rigid rib mounted to the first end of the camera stay maintains the position of the CCDs to its designed position.

SUMMARY

The conventional vehicular camera apparatus is configured such that the housing, i.e. camera stay, to which the imaging units are supported, integrally includes the secure member to be fastened to a vehicle with bolts. The inventors have conducted detailed examination of the above configuration of the conventional vehicular camera apparatus, and, as a result of the detailed examination, have found that strong force applied to the secure member for fastening the bolts may cause the support portion of the housing, which supports the imaging units, to be distorted. This may cause the installation position of each imaging unit to be deviated from a corresponding desired position, i.e. a corresponding previously designed position.

In view of the above circumstances, an exemplary aspect of the present disclosure seeks to provide vehicular camera apparatuses respectively including housings that are mountable to vehicles; each of the vehicular camera apparatuses is designed to reduce the possibility of the corresponding housing being deviated from its original position, i.e. a designed position.

According to an exemplary aspect of the present disclosure, there is provided a vehicular camera apparatus. The vehicular camera apparatus includes at least one imaging unit captures an image of a region located outside a vehicle, and a first housing configured to install the at least one imaging unit thereto. The vehicular camera apparatus includes a housing assembly that includes a second housing configured as a separate member from the first housing, and that includes a vehicle attachment provided to the second housing and attached to a part of the vehicle. The housing assembly is configured to fixedly support the first housing between the part of the vehicle and the second housing while the vehicle attachment is attached to the part of the vehicle.

This configuration prevents, even if there is distortion in the second housing, this distortion from being directly reflected as distortion of the first housing, thus preventing the position of the at least one imaging unit from being deviated from its designed position.

DETAILED DESCRIPTION OF EMBODIMENT

The following describes an exemplary embodiment of the present disclosure with reference to the accompanying drawings.

Configuration

Figure 1:
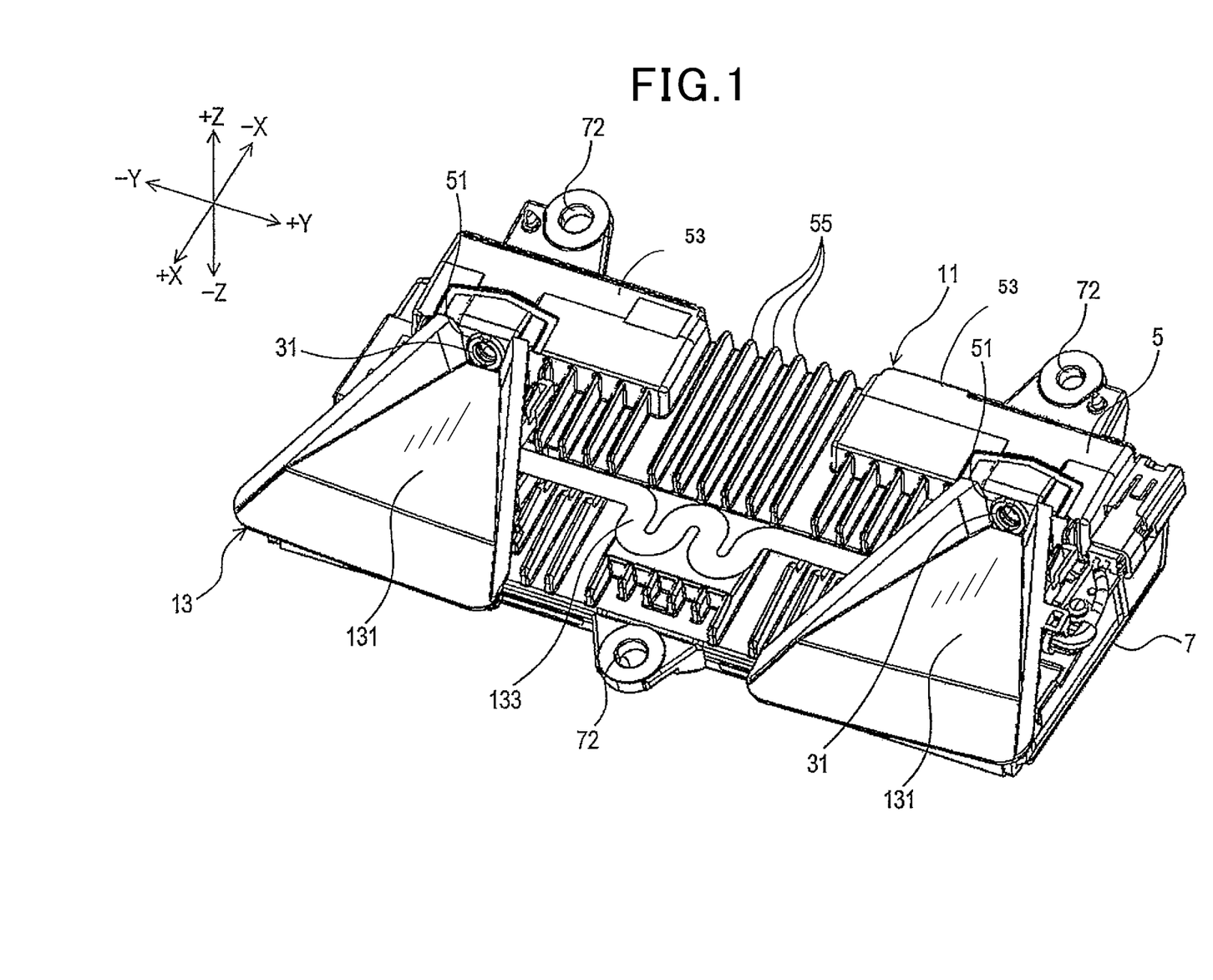
FIG. 1 is a perspective view schematically illustrating a vehicular camera apparatus to an exemplary embodiment.
Figure 2:
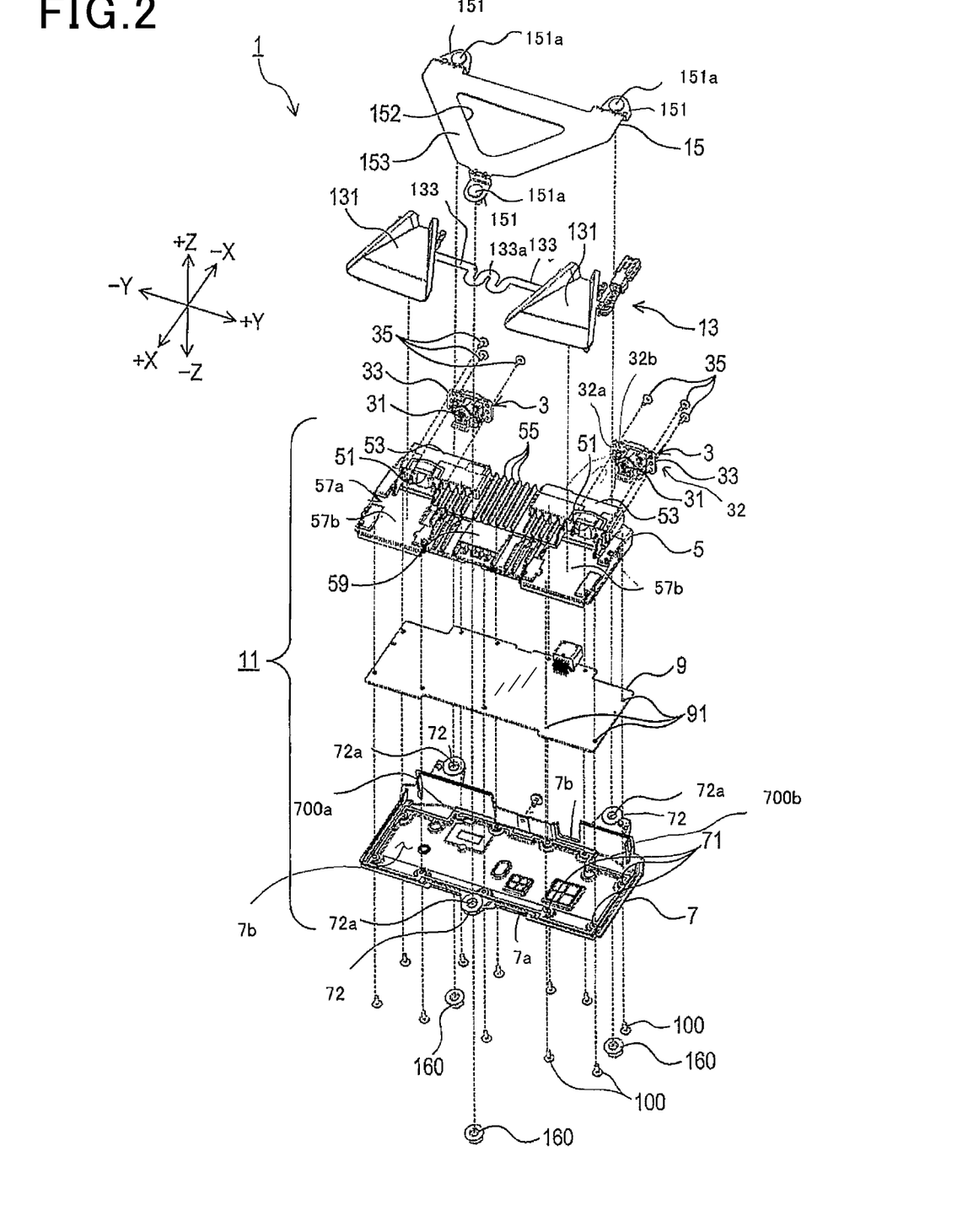
FIG. 2 is an exploded perspective view schematically illustrating the vehicular camera apparatus illustrated in FIG. 1.

As shown in FIGS. 1 and 2, the vehicular camera apparatus 1 of the exemplary embodiment is comprised of a camera body 11 including first and second imaging units 3, a first housing 5, a second housing 7, and a circuit board 9. The circuit board 9 executes various control tasks based on information items sent from each of the first and second imaging units 3. In addition to the camera body 11, the vehicular camera device 1 includes a heater 13, a bracket 15, and heat dissipation fins 55.

The vehicular camera apparatus 1 is installed in a vehicle V (see FIG. 3) such that an imaging direction of the vehicular camera apparatus 1 is oriented toward a positive X direction (+X direction) in FIG. 1; the opposite direction of the positive X direction is defined as a negative X direction (−X direction) (see FIGS. 1 and 2).

The first housing 5 has a substantially rectangular plate-like shape. The left direction of the longitudinal directions of the first housing 5 relative to the positive X direction is defined as a positive Y direction (+Y direction), and the right direction of the longitudinal directions of the first housing 5 is defined as a negative Y direction (−Y direction) (see FIGS. 1 and 2). If the positive and negative orientations of the positive and negative X directions can be disregarded, the positive and negative X directions can be represented simply as an X direction. Similarly, if the positive and negative orientations of the positive and negative Y directions can be disregarded, the positive and negative Y directions can be represented simply as a Y direction.

The first housing 5 is configured such that right and left rear corners relative to the positive X direction thereof are protruded in perpendicular to an XY plane defined by the X and Y direction to respectively constitute rectangular-parallelepiped containers 53. The containers 53 are aligned in the Y direction, and each of the containers 53 extends to be close to each other in the Y direction to provide a space therebetween.

Each of the containers 53 has a positive X-side wall though which an opening 51 having, for example, a circular shape.

Each of the first and second imaging units 3 is configured to capture an image of a region, such as a region in front of the vehicle V, located outside the vehicle V.

Specifically, each of the first and second imaging units 3 includes a lens module 31 and an imaging board 32.

The lens module 31 is comprised of, for example, a substantially cylindrical shaped lens barrel, and, for example, at least one lens coaxially provided to the lens barrel. Each of the first and second imaging units 3 is installed in a corresponding one of the containers 53 such that the least one lens of the corresponding lens module 31 is at least partly exposed from the opening 51 of the corresponding one of the containers 53.

The imaging board 32 has, for example, a rectangular plate-like shape, and has opposing first and second major surfaces 32a and 32b. The imaging board 32 includes an image sensor, such as a charge coupled device (CCD) comprised of, for example, a plurality of light-sensitive elements, such as image capturing elements, arranged in, for example, a two-dimensional array to constitute an imaging surface.

The image sensor is disposed to face the lens unit 31 such that light collected by the lens unit 31 is formed on the imaging surface of the image sensor as an image. Each of the light-sensitive elements constituting the imaging surface is sensitive to an amount or a level of light formed on the imaging area as an image. Specifically, each of the two-dimensionally arranged light-sensitive elements, which serve as pixels, is configured to receive a component of the light directed from the lens unit 31. Then, each of the two-dimensionally arranged light-sensitive elements is configured to convert the intensity or luminance level of the received light component into an electrical pixel signal that is proportional to the luminance level of the received light component.

In particular, the vehicular camera apparatus 1 is configured as a so-called stereo camera including the first and second imaging units 3. The first housing 5 is configured such that the first and second imaging units 3 installed in the respective containers 53 have a predetermined positional relationship therebetween. For example, the interval of the containers 53 is defined such that the minimum distance between the optical axis of the first imaging unit 3 and the optical axis of the second imaging unit 3 is set to a predetermined length.

The protrusion direction of each container 53 relative to the XY plane is defined as a positive Z direction; the opposite direction of the positive Z direction will be referred to as a negative Z direction. If the positive and negative orientations of the positive and negative Z directions can be disregarded, the positive and negative Z directions can be represented simply as a Z direction.

The positive and negative X directions, the positive and negative Y directions, and the positive and negative Z directions constitute a right-handed orthogonal coordinate system. Hereinafter, the positional relationships among components of the vehicular camera apparatus 1 can be described based on the right-handed orthogonal coordinate system. The right-handed orthogonal coordinate system can be correlated with or independent from an actual coordinate system of the vehicular camera apparatus 1 being used.

The flanges 33 of each of the first and second imaging units 3 are respectively fastened to predetermined portions of the inner surface of the positive X-side wall of the corresponding container 53 with, for example, screws 35. This results in each of the imaging units 3 being installed in the corresponding one of the containers 53 of the first housing 5 while the least one lens of the corresponding lens module 31 is at least partly exposed from the opening 51 of the corresponding one of the containers 53. This results in each of the imaging units 3 being installed in the corresponding one of the containers 53 of the first housing 5.

When viewed in the positive Z direction or negative Z direction, the outline of each of the first housing 5, the circuit board. 9, and the second housing 7 has a substantially common rectangular shape. The second housing 7 has a plurality of through holes, which serves as, for example, housing joint holes, 71 formed through a rectangular peripheral edge thereof with respectively predetermined intervals, and the circuit board. 9 also has a plurality of through holes 91 formed through a rectangular peripheral edge thereof with respectively predetermined intervals. When the circuit board 9 is mounted on the second housing 7, the through holes 91 of the circuit board 9 are respectively aligned with the respective through holes 71 of the second housing 7.

Specifically, the circuit board 9 is mounted on the second housing 7 while the through holes 91 of the circuit board 9 are respectively aligned with the respective through holes 71 of the second housing 7 in the Z direction, and the first housing 5 is mounted on the circuit board 9 while the peripheral edge of the first housing 5 is mounted on the peripheral edge of the circuit board 9.

While the first housing 5, to which the first and second imaging units 3 are mounted, the circuit board 9, and the second housing 7 are stacked from the negative Z-direction side to the positive Z-direction side, screws, serves as, for example, housing joint screws, 100 are inserted from the negative Z-direction side through the through holes 71 and 91 so as to be threadably engaged with the peripheral edge of the first housing 5. This enables the first housing 5, the circuit hoard 9, and the second hosing 7 to be fastened to each other, resulting in the camera body 11, which incorporates therein the first and second imaging units 3, being assembled.

The heater 13 is comprised of a pair of hoods 131 and a heating wire member 133 located between the hoods 131 to join them, resulting in (1) One of the hoods 131, the heating wire member 133, and the other of the hoods 131 being aligned with each other (2) The hoods 131 being thermal transferable from the heating wire member 131 when the heating wire member 131 is energized The heating wire member 133 has a zigzag portion 133a having a substantially zigzag shape and located at the midpoint thereof.

As illustrated in FIGS. 1 and 2, the first housing 5 is comprised of a substantially flat portion 57 in addition to the containers 53. The substantially flat portion 57 has a first major surface oriented toward the positive Z direction, and a second major surface oriented toward the negative Z direction.

The first major surface has a heater mount surface portion 57a on which the heater 13 is mounted. The first major surface also has remaining surface portions serving as fin mount surface portions on which the heat dissipation fins 55 are mounted.

The heater mount surface portion 57a is comprised of a pair of hood mount surface portions 57b located at the right and left front corners relative to the positive X direction thereof in the positive Z direction so that each of the hood mount surface portions 57b is located in the positive Z direction relative to the corresponding one of the lens modules 31. The hoods 131 of the heater 13 are mounted on the respective hood mount surface portions 57b. The first major surface 57a also has a zigzag-portion mount surface portion 59 located between the hood mount surface portions 57b separately from the hood mount surface portions 57b; the zigzag portion 133a of the heating wire member 133 is mounted on the zigzag-portion mount surface portion 59.

That is, the heater 13 is mounted on the heater mount portion 57a of the first major surface of the substantially flat portion 57 while the hoods 131 are mounted on the respective hood-mount surface portions 57b and the zigzag portion 133a of the heating wire member 133 is mounted on the zigzag-portion mount surface portion 59.

In other words, the heater mount surface portion 57a of the first major surface of the substantially flat portion 57 serves as a fin-less surface portion.

Each hood 131 includes a trapezoidal bottom wall having shorter and longer sides parallel with each other. Each hood 131 also includes two sidewalls projecting in the positive Z direction from the respective lateral sides of the bottom wall. Each hood 131 is mounted on the corresponding one of the hood-mount surface portions 57a such that the shorter side of the bottom wall of the hood 131 is closer to the corresponding lens module 31 than the longer side is. The sidewalls of each hood 131 are located in the positive Z direction relative to the corresponding lens module 31 and located outside an imaging region defined by the corresponding lens module 31. In other words, the sidewalls of each hood 131 serve as partitions that separate the imaging region defined by the corresponding lens module 31 from the outside. This configuration and arrangement of each hood 131 prevent scenes located outside the imaging region defined by the corresponding lens module 31 from being received by the corresponding image sensor the corresponding lens module 31.

The heating wire member 133 is electrically connected to, for example, an unillustrated power source provided on the circuit board 9 or an unillustrated power source provided in the vehicle V via the circuit board 9. When energized, the zigzag portion 133a of the heating wire member 133 generates heat. The zigzag portion 133a enables variations in the mount positions of the respective hoods 131 to be absorbed.

The second housing 7 has opposing first and second longitudinal sides 7a and 7b; the first longitudinal side 7a is located at the positive X-directional side, and the second longitudinal side 7b is located at the negative X-directional side. The middle of the longitudinal side 7a protrudes in the positive X relative to the corresponding longitudinal side of each of the first housing 5 and the circuit board 9, resulting in an attachment flange 72 being provided.

The second housing 7 has support walls 700a and 700b respectively mounted on both ends of the longitudinal side 7b extending along the positive Z direction. Positive Z-directional ends of the respective support walls 700a and 700b protrude in the negative X direction relative to the corresponding longitudinal side of each of the first housing 5 and the circuit board 9, resulting in attachment flanges 72 being provided.

The attachment flanges 72 projecting from the respective support walls 700a and 700b are higher than the attachment flange 72 projecting from the longitudinal side 7a of the second housing 7.

Each of the attachment flanges 72 has, for example, a circular portion through which a through hole 72 is formed in the Z direction. Each of the through holes 72 has a diameter longer than a diameter of each of the through holes 71 and 91.

The bracket 15 substantially has a triangular plate-like shape, and has attachment flanges 151 at respective apexes thereof. Each of the attachment flanges 151 has a through hole through which a support bolt 151a is fitted such that its threaded portion projects in the negative Z direction. The bracket 15 is configured to be in conformity with the attachment flanges 72 such that the camera body 11 assembled with the heater 13 being mounted on the first housing 5 set forth above can be mounted at its first housing 5 on the bracket 15 while the support bolts 151a penetrate through the respective through holes 72a. Nuts 160 are threaded into the respective bolts 151, making it possible to fixedly mount the camera body 11 to the bracket 15.

The bracket 15 has a triangular through hole 152 formed at its center portion; the triangular through hole 152 is substantially similar in shape to the triangular outline of the bracket 15.

Figure 3:
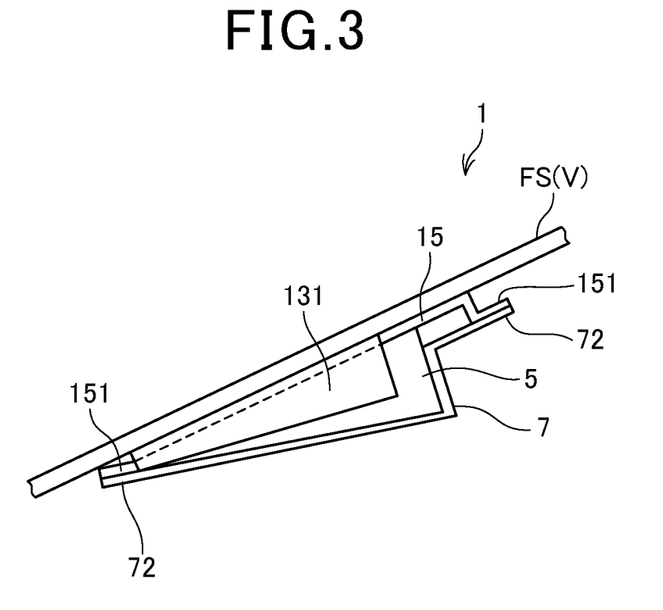
FIG. 3 is a side view of the vehicular camera apparatus in which illustration of screws, bolts, and other some elements is omitted.

The bracket 15 has a first major surface 153 and a second major surface opposite to the first major surface 153. As illustrated in FIG. 3, the first major surface 153 of the bracket 15 is attached to, for example, the top of the inner surface of a front windshield FS of the vehicle V with an adhesive while (1) The Y direction is aligned with the width direction of the vehicle V (2) Each of the positive X direction and positive Z direction is oriented in front of the vehicle V The first major surface 153 of the bracket 15 can be subjected to, for example, drawing to improve the intensity of the bracket 15. The bracket 15 can be disposed in a different posture from that described above, if necessary. The bracket 15 can be adhered to another position of the inner surface of the windshield FS or to a selected component of the vehicle V other than the front windshield FS.

After the bracket 15 is adhered to the inner surface of the front windshield FS, the camera body 11 assembled with the heater 13 being mounted on the first housing 5 set forth above is fastened to the bracket 15 while the nuts 160 are threaded to the respective bolts 151, making it possible to mount the vehicular camera apparatus 1 to the inner surface of the front windshield FS of the vehicle V.

For example, when the vehicular camera apparatus 1 is installed in the vehicle V, the positive X direction corresponds to the front direction of the vehicle V, the negative X direction corresponds to the rear direction of the vehicle V, the positive Y direction corresponds to the left direction of the vehicle V, the negative Y direction corresponds to the right direction of the vehicle V, the positive Z direction corresponds to the upper direction, i.e. height direction, of the vehicle V, and the negative Z direction corresponds to the lower direction of the vehicle V.

Note that the bracket 15, the attachment flanges 72, the nuts 60, and the support bolts 151a serve as, for example, a vehicle attachment, and the vehicle attachment and the second housing 7 constitute a housing assembly.

Technical Effects

The vehicular camera apparatus 1 according to the present embodiment described in detailed above obtains the following technical effects.

When the nuts 160 are tightened to the respective bolts 151, the camera body 11 might be distorted by the stress due to the tightening.

However, the vehicular camera apparatus 1 of the present embodiment includes the first housing 5, to which the first and second imaging units 3 are installed, is configured as a separate member from the second housing 7 that is attached to the vehicle V with the bracket 15 and the nuts 160. In addition, the first housing 5 is joined to the second housing 7 with the screws 100.

This configuration therefore prevents, even if there is distortion in the second housing 7 at the time of tightening the nuts 160, this distortion from being directly reflected as distortion of the first housing 5, thus preventing the position of each imaging unit 3 from being deviated from its designed position.

Additionally, the first housing 5 and the second housing 7 are screwed to each other with the screws 100 without being welded or bonded to each other. This configuration therefore further prevents, even if there is distortion in the second housing 7 at the time of tightening the nuts 160, this distortion from being directly reflected as distortion of the first housing 5, thus further preventing the position of each imaging unit 3 from being deviated from its designed position.

Note that, even if the first housing 5 and the second housing 7 are screwed to each other, stress may be applied to the first housing 5. However, the stress applied to the first housing 5 is extremely smaller, resulting in little distortion occurring in the first housing 5. Additionally, when the camera body 11 is assembled, calibration, i.e. the act of checking or adjusting the accuracy of the vehicular camera device 1, is usually performed, resulting in cancellation of the distortion generated in the first housing 5 at the time of assembling the camera body 11.

In contrast, after the camera body 11 is fixed to the vehicle V by tightening the nuts 160 to the respective bolts 151, it might be difficult to cancel the above distortion by calibration or other similar adjusting approaches.

That is, the above configuration of the vehicular camera apparatus 1, which prevents, even if there is distortion in the second housing 7 at the time of tightening the nuts 160, this distortion from being directly reflected as distortion of the first housing 5, offers an extremely remarkable effect to users of the vehicular camera apparatus 1.

The vehicular camera apparatus 1 according to the present embodiment is configured such that the second housing 7 and the first housing 5 are screwed to each other with the circuit board 9 stored in therebetween. This configuration therefore enables the circuit board 9 to serve as a buffer against distortion, making it possible to still further prevent, even if there is distortion in the second housing 7 at the time of tightening the nuts 160, this distortion from being directly reflected as distortion of the first housing 5, thus still further preventing the position of each imaging unit 3 from being deviated from its designed position.

When the vehicular camera apparatus 1 is attached to the vehicle V as described above, the second housing 7 supports, by a positive Z-directional surface 7b, i.e. an upper end surface 7b, the first housing 5 and the first and second imaging units 3 from below. That is, the first housing 5 is sandwiched between the front windshield FS and the second housing 7.

This configuration therefore makes it possible to reduce tightening force, needed to connect between the first and second housing 5 and 7 with the screws 100, to a level enough to prevent the first housing 5 from horizontally shifting, without maintaining the tightening force to a level enough to cope with the total weight of the first housing 5 and the first and second imaging units 3. This therefore results in very smaller distortion in the second housing 7 occurring at the time of tightening the screws 100. This makes further smaller distortion in the first housing 5 due to the distortion of the second housing 7, thus still furthermore preventing the position of each imaging unit 3 from being deviated from its designed position.

The vehicular camera apparatus 1 according to the present embodiment includes the first and second imaging units 3. Reducing the deviation of the actual position of each of the first and second imaging units 3 from its designed position as described above enables the relative positional relationship between the first and second imaging units 3 to be reduced, making it possible to offer, to users of the vehicular camera apparatus 1, an extremely more remarkable effect based on the reduction of the deviation of the actual position of each imaging unit 3 from its designed position In addition, the vehicular camera apparatus 1 of the present embodiment includes the heater 13 whose heating wire member 133, i.e. its zigzag portion 133a, generates heat when the vehicular camera apparatus 1 attached to the inner surface of the front windshield FS when energized to thereby reduce fogging of each of the front windshield FS and the at least one lens of the lens module 31. In particular, the heater 13 is configured such that the hoods 131 are joined to each other via the heating wire member 133. This configuration enables heat generated by the heating wire member 133 to warm the hoods 131 to thereby reduce fogging of each of the front windshield FS and the at least one lens of the lens module 31.

Note that the nuts 160 each correspond to, for example, a fastening member and a first screw. The screws 100 each correspond to, for example, a joint member and a second screw. The nuts 160 each correspond to, for example, a first screw designed as a female screw.

Modifications

The present embodiment for carrying out the present disclosure has been described above. The present disclosure is not limited to the present embodiment described above, and can be implemented by various modifications.

In the present embodiment described above, the first housing 5 and the second housing 7 are joined to each other with the screws 100, but the present invention is not limited thereto. For example, the first housing 5 and the second housing 7 can be joined to each other with rivets or other fastening members, such as hooks. Even if the screws 100 are used, the first housing 5 can have a plurality of through holes formed through a rectangular peripheral edge thereof and aligned with the respective through holes 71 and 91. At that time, the first housing 5, the circuit board 9, and the second housing 7 are stacked while the through holes of the first housing 5, the through holes 91, and the through holes 71 are aligned with each other, each of the screws 100 can be inserted from, for example, the negative Z direction of the second housing 7 through a corresponding one of the through holes 71 to project outwardly through a corresponding one of the through holes of the first housing 5. Then, nuts can be prepared to be threaded into the projecting ends of the respective screws 100.

In the above present embodiment, the first housing 5 and the second housing 7 are joined to each other with the circuit board 9 stored in therebetween, but the present invention is not limited thereto.

For example, the circuit board 9 can be incorporated in the first housing 5 and the second housing 7, and the first housing 5 and the second housing 7 can be directly joined to each other around the circuit board 9.

In the above present embodiment, the second housing 7 supports the first housing 5 from below, but the present invention is not limited thereto. For example, the second housing 7 can support the first housing 5 from the side or from above.

The vehicular camera apparatus 1 according to the present embodiment is configured as a so-called stereo camera including the first and second imaging units 3, but is not limited thereto. For example, the vehicular camera apparatus 1 can be a so-called monocular camera having a single imaging unit 3. The vehicular camera apparatus according to this modification also prevents the position of the single imaging unit 3 from being deviated from its designed position.

The vehicular camera apparatus 1 according to the present embodiment includes the heater 13 between the first housing 5 and the bracket 15, but is not limited thereto. For example, the heater 13 can be omitted, or the shapes of, for example, the respective heater 13, bracket 15, first housing 5, and second housing 7 can be varied other than the illustrated shapes.

Figure 4:
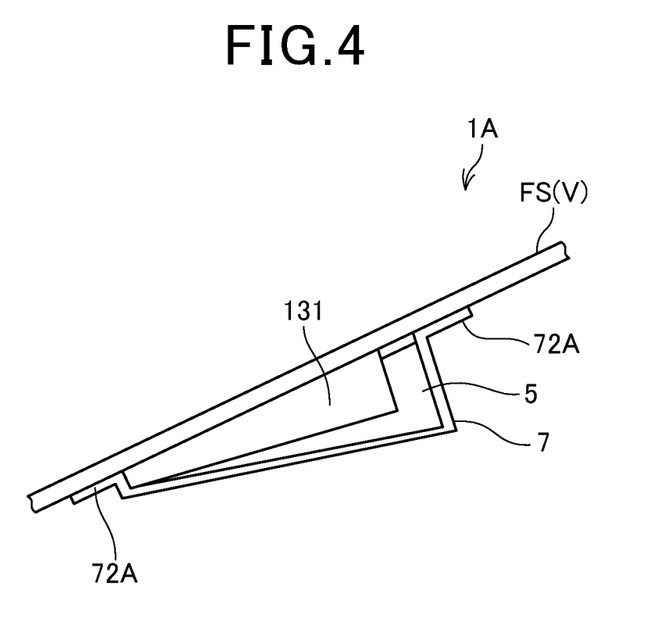
FIG. 4 is a side view of a modified vehicular camera apparatus in which illustration of screws, bolts, and other some elements is omitted.

The camera body 11 of the vehicular camera apparatus 1 according to the present embodiment is attached to the vehicle V via the bracket 15, but the present disclosure is not limited thereto. For example, the vehicular camera apparatus 1 can be mounted to the vehicle V such that (1) Bolts protruding directly from, a part of, such as the roof of the vehicle V are penetrated through the respective through holes 72 to project therefrom (2) The nuts 160 are threaded into the projecting ends of the bolts As illustrated in FIG. 4, a modified vehicular camera apparatus 1A is configured such that attachment flanges 72A projecting from the second housing 7 set forth above are directly attached to the inner surface of the front windshield FS. This enables the bracket 15 to be eliminated from the modified vehicular camera apparatus 1A.

A plurality of functions of one component in the present embodiment can be implemented by a plurality of components, or a function of one component can be implemented by a plurality of components. In addition, a plurality of functions of a plurality of elements can be implemented by one element, or a single function implemented by a plurality of elements can be implemented by one element. In addition, a part of the configuration of the present embodiment can be omitted. At least a part of the configuration of the present embodiment can be added to or substituted for the configuration of one of the modifications. It is to be noted that all aspects included in the technical idea specified by the words described in the claims are embodiments of the present disclosure.

What is claimed is:

1. A vehicular camera apparatus comprising:
   at least one imaging unit configured to capture an image of a region located outside a vehicle;
   a first housing configured to include the at least one imaging unit installed thereto; and
   a housing assembly comprising:
      a second housing configured as a separate member from the first housing; and
      a vehicle attachment provided to the second housing and attached to a part of the vehicle,
   the housing assembly being configured to fixedly support the first housing between the part of the vehicle and the second housing while the vehicle attachment is attached to the part of the vehicle,
   wherein:
      the vehicle attachment comprises:
         a first projection member projecting toward a front direction of the vehicle away from the first housing; and
         a second projection member projecting toward a rear direction of the vehicle away from the first housing;
      the second housing has a front end facing the front direction of the vehicle, and a rear end facing the rear direction of the vehicle; and
      the first projecting member is attached to the front end of the second housing and the second projecting member is attached to the rear end of the second housing to thereby sandwich the first housing between the vehicle attachment and the second housing.

2. The vehicular camera apparatus according to claim 1, wherein:
   the vehicle attachment comprises:
      a fastening member configured to fasten the second housing to the part of the vehicle,
   the vehicular camera apparatus further comprising:
      a joint member configured to join the first housing and the second housing to each other,
   wherein:
      the fastening member includes a first screw; and
      the joint member includes a second screw threaded into at least one of the first housing and the second housing to thereby join the first housing and the second housing to each other.

3. The vehicular camera apparatus according to claim 2, further comprising a circuit board configured to perform control related to the at least one imaging unit, wherein the second screw is configured to join the first housing and the second housing to each other with the circuit board stored in between the first housing and the second housing.

4. The vehicular camera apparatus according to claim 1, wherein:
   the housing assembly supports the first housing toward the part of the vehicle while the first housing is sandwiched between the part of the vehicle and the second housing.

5. The vehicular camera apparatus according to claim 1, wherein:
the vehicle attachment comprises a plurality of projection members projecting from the second housing; and
a part of the first housing is located between the projection members.

6. The vehicular camera apparatus according to claim 1, wherein:
the vehicle attachment comprises:
at least one bolt; and
at least one projection member projecting from the second housing in at least one of a front direction, a rear direction, a right direction, and a left direction of the vehicle;
the at least one projection member comprises a hole formed therethrough,
the at least one bolt being threaded into the hole of the at least one projection member to thereby fasten the second housing to the part of the vehicle.

7. The vehicular camera apparatus according to claim 6, further comprising:
at least one housing joint hole formed through the second housing; and
at least one housing joint screw configured to be penetrated through the at least one housing joint hole to join the first housing and the second housing,
wherein:
the hole formed through the at least one projection member has a first diameter; and
the at least one housing joint hole has a second diameter,
the first diameter formed through the at least one projection member being larger than the second diameter of the at least one housing joint hole.

8. The vehicular camera apparatus according to claim 6, the at least one projection member comprises at least a first projection member in the front direction of the vehicle, and at least a second projection member in the rear direction of the vehicle;
the second housing has a rear end, and a wall mounted on the rear end and extending along a height direction of the vehicle;
the second projection member projects from the wall in the rear direction; and
the second projection member is higher than the first projection member.

9. The vehicular camera apparatus according to claim 1, wherein:
the at least one imaging unit comprises a first imaging unit and a second imaging unit; and
the first housing is configured to install each of the first and second imaging units to a predetermined position thereof such that the first imaging unit and the second imaging unit have a predetermined positional relationship therebetween.

10. The vehicular camera apparatus according to claim 1, wherein:
the vehicle attachment comprises a bracket; and
the housing assembly is configured to mount the first housing to the part of the vehicle through the bracket while the second housing is mounted to the bracket, and the bracket is attached to the part of the vehicle.

11. The vehicular camera apparatus according to claim 10 wherein:
the vehicle attachment further comprises at least one first projection member projecting from the second housing;
the bracket comprises a bracket body and at least one second projection member projecting from the bracket body, the at least one second projection member being aligned with the at least one first projection member;
the bracket body is directly attached to the part of the vehicle while the at least one second projection member is fastened to the at least one first projection member.

12. The vehicular camera apparatus according to claim 1, wherein:
the second housing is configured to cover a lower end of the at least one imaging unit; and
the lower end of the at least one imaging unit is located to be lower than a position of the vehicle attachment provided to the second housing in a height direction of the vehicle.

* * * * *